(12) United States Patent
Seki et al.

(10) Patent No.: US 7,708,107 B2
(45) Date of Patent: May 4, 2010

(54) SUSPENSION STRUCTURE FOR A VEHICLE

(75) Inventors: Bunzo Seki, Saitama (JP); Tomoaki Yamagata, Saitama (JP); Shigeto Inami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 795 days.

(21) Appl. No.: 11/527,806

(22) Filed: Sep. 27, 2006

(65) Prior Publication Data

US 2007/0074925 A1    Apr. 5, 2007

(30) Foreign Application Priority Data

Sep. 30, 2005    (JP) .............................. 2005-287711

(51) Int. Cl.
*B60K 17/00* (2006.01)
(52) U.S. Cl. ..................................... 180/374
(58) Field of Classification Search ............... 180/374, 180/370; 280/124.134
See application file for complete search history.

(56) References Cited

U.S. PATENT DOCUMENTS 6,510,916 B2 * 1/2003 Hori et al. .................. 180/374
6,868,932 B1 * 3/2005 Davis et al. .................. 180/292

FOREIGN PATENT DOCUMENTS

JP    63-90486    4/1988

* cited by examiner

*Primary Examiner*—Faye M. Fleming
(74) *Attorney, Agent, or Firm*—Carrier, Blackman & Associates, P.C.; William D. Blackman; Joseph P. Carrier

(57) ABSTRACT

A suspension system structure is provided which permits a suspension arm to be disposed without being affected by a driven sprocket or a brake disc. A final drive case is supported on rear portions of left and right vehicle body subframes. A driven sprocket and a brake disc are coaxially disposed on the left and right of the final drive case. The driven sprocket and the brake disc are disposed on the inside of the vehicle body frame. An upper arm and a lower arm are disposed on the outside of the vehicle body frame. Support portions of the upper arm and the lower arm relative to the vehicle body frame are overlapped partly with the driven sprocket and the brake disc in a side view to provide a guard therefor.

18 Claims, 6 Drawing Sheets

SUSPENSION STRUCTURE FOR A VEHICLE

CROSS-REFERENCE TO RELATED APPLICATIONS

The present invention claims priority under 35 USC 119 based on Japanese patent application No. 2005-287711, filed on Sep. 30, 2005. The subject matter of this priority document is incorporated by reference herein.

BACKGROUND OF THE INVENTION

1. Field of the Invention

The present invention relates to vehicular suspension systems. More particularly, the present invention relates to a structure for advantageously disposing a driven sprocket or a brake disc on a vehicle in relation to the suspension system.

2. Description of the Background Art

A known suspension structure is constructed as follows. The structure includes a final drive case of an independent suspension system supported between left and right vehicle body frames. A suspension arm forming part of the independent suspension system is disposed outward of a corresponding one of the left and right vehicle body frames. Further, a driven sprocket and a brake disc are coaxially disposed on either side of the final drive case and outside the corresponding one of the left and right vehicle body frames. Such a suspension structure is disclosed, for example, in Japanese Patent Laid-open No. Sho 63-90486.

A suspension arm is one of several members that form a suspension system. The suspension arm is disposed on a vehicle body frame around a final drive case. If, in this circumstance, a driven sprocket or a brake disc is further disposed outside a vehicle body frame, there is a need to dispose (circumventive disposition) or structure (circumventive structure) the suspension arm so as to extend around or circumvent the driven sprocket or the brake disc. The circumventive disposition, however, leads to more restrictions imposed on vehicle layout. The circumventive structure requires that a relief structure be disposed in the suspension arm. This relief structure hinders sufficient rigidity, and thus weight is increased to achieve sufficient rigidity. It is therefore an object of the present invention to provide a suspension structure that requires no such circumventive disposition or circumventive structure.

SUMMARY

To solve the foregoing problems, a suspension structure according to a first aspect of the present invention includes a final drive case of a transmission system supported on a vehicle body frame and left and right drive wheels supported on left and right vehicle body subframes via suspension arms. Further, the final drive case includes a driven sprocket, to which a driving force of an engine is transmitted, and a brake disc mounted coaxially therewith. In this suspension structure, the suspension arms are disposed outside the vehicle body frame and the driven sprocket and the brake disc are disposed inside the vehicle body frame.

According to the first aspect of the present invention, the suspension arms are disposed outside the vehicle body frame and the driven sprocket and the brake disc are disposed inside the vehicle body frame. These arrangements eliminate the need for the circumventive disposition or the circumventive structure for the suspension arms. As a result, the driven sprocket and the brake disc can be provided without having to change the structure of the suspension arms. In addition, the driven sprocket and the brake disc are disposed inside the vehicle body frame. It is therefore possible to let the vehicle body frame function as a guard member for the driven sprocket and the brake disc.

In the suspension structure in accordance with a second aspect of the present invention, in addition to the arrangements of the first aspect of the present invention, the vehicle body frame includes a support portion of the suspension arm. Further, at least part of this support portion is disposed so as to overlap the driven sprocket or the brake disc in a side view.

According to the second aspect of the present invention, part of the support portion of the suspension arms overlap part of the driven sprocket and the brake disc in the side view. This allows the support portion of the suspension arms to serve as a guard member.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A specific embodiment to which the present invention is applied will be described below with reference to the accompanying drawings. It should be understood that only structures considered necessary for clarifying the present invention are described herein. Other conventional structures, and those of ancillary and auxiliary components of the system, are assumed to be known and understood by those skilled in the art. Throughout the descriptions given hereunder, directional expressions, including "front," "rear," "left," and "right," are used with reference to the vantage point of a driver seated on the vehicle and facing forward under use conditions, unless otherwise specified.

Figure 1:
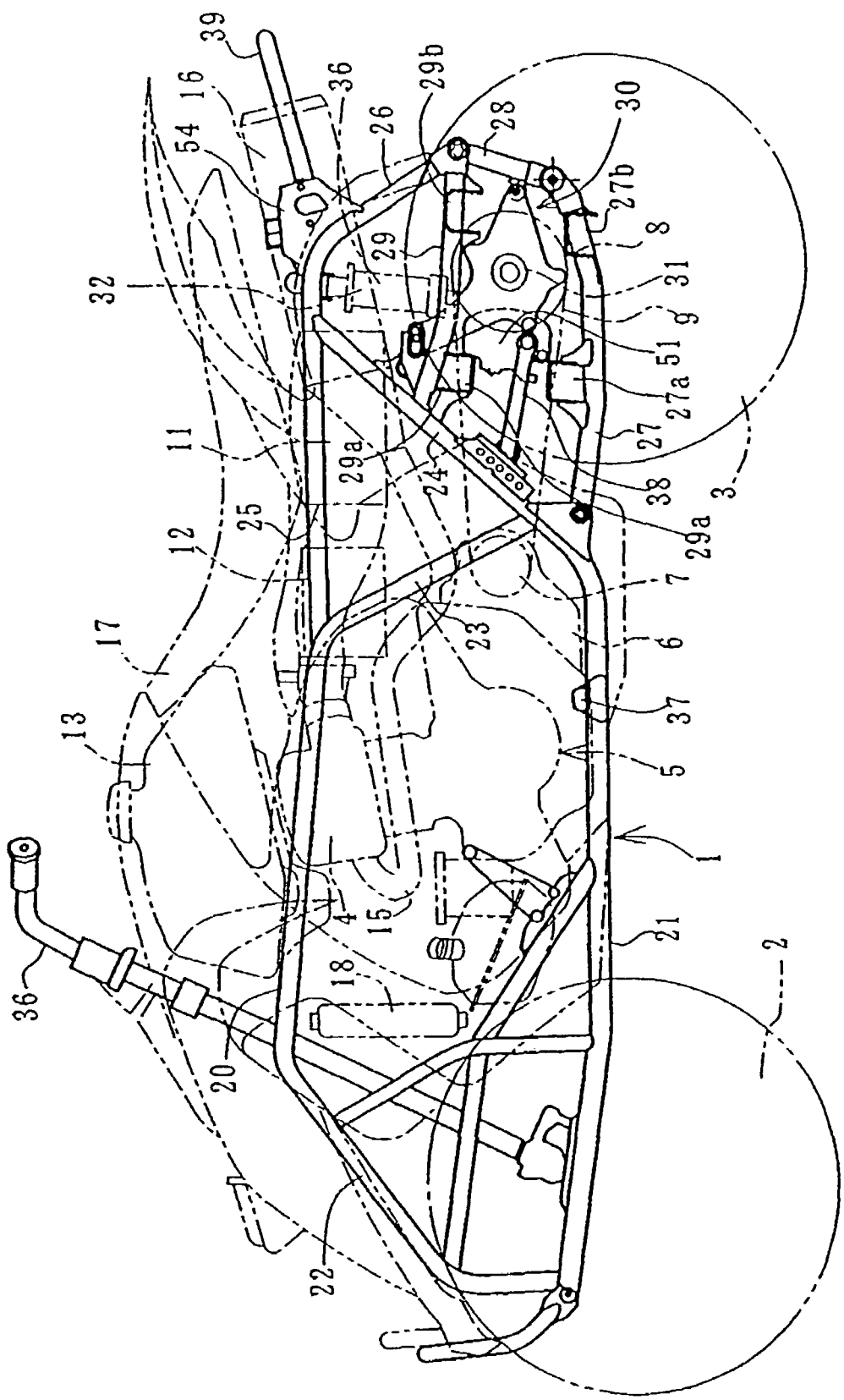
FIG. 1 is a side elevational view of a four-wheeled all-terrain saddle-type vehicle showing a vehicle body frame structure according to an embodiment of the present invention.

FIG. 1 is a left side elevational view showing principal parts of a four-wheeled vehicle according to an embodiment of the present invention. The four-wheeled vehicle shown in the drawing is a saddle-riding type vehicle intended for rough road and/or off road use. The vehicle includes a pair of left and right front wheels 2 and a pair of left and right rear wheels 3, disposed at front and rear of a vehicle body frame 1, respectively. The front wheels 2 and the rear wheels 3 are a low pressure balloon tire having a relatively large diameter.

An engine 5 having a forwardly-inclined cylinder 4 is mounted at substantially a center of the vehicle body frame 1. A crankcase 6, which forms a lower portion of the engine 5, functions also as a transmission case. A drive sprocket 7 is disposed at a rear portion of the crankcase 6 and a driven sprocket 8 is disposed on a side of the rear wheels 3. A chain 9 is wound around the drive sprocket 7 and the driven sprocket 8, so that the rear wheels 3 are driven through the chain 9. The rear wheels 3 are suspended to a rear portion of a vehicle body by a double wishbone type suspension system.

An exhaust pipe 15 has a proximal end portion connected to a front portion of a cylinder head. The exhaust pipe 15 is extended sideways in relation to the cylinder 4 and then connected to a muffler 16 disposed in the rear portion of the vehicle body. As shown in FIG. 1, the four-wheeled vehicle also includes an air cleaner 11, a battery 12, a fuel tank 13, and a seat 17.

The vehicle body frame 1 includes an upper frame 20, a lower frame 21, a front down frame 22, and a rear down frame 23. The upper frame 20 and the lower frame 21 are extended in a fore-aft direction substantially in parallel with each other at an upper and lower portion, respectively, of the vehicle body frame 1. The front down frame 22 is formed by bending a front portion of the upper frame 20. The front down frame 22 is extended obliquely downwardly toward the front. The rear down frame 23 is formed by bending a rear portion of the upper frame 20. The rear down frame 23 is disposed through a rearward portion of the engine 5. These members form a continuous closed loop in a side view.

The lower frame 21 has a rear portion that is bent at a point near a lower end portion of the rear down frame 23. The rear portion then extends obliquely upwardly toward the rear to form a rear frame 24. A rear end portion of the rear frame 24 is connected to an intermediate portion in the fore-aft direction of a seat rail 25 that extends substantially horizontally toward the rear from a point near a connection between a rear end portion of the upper frame 20 and the rear down frame 23.

The seat rail 25 has a rear portion that forms an overhang portion 26. The overhang portion 26 extends rearwardly from a portion thereof, to which an upper end portion of the rear frame 24 is connected. The overhang portion 26 is then bent obliquely downwardly. The overhang portion 26 is then connected to a rear end of a lower arm support pipe 27 via a vertical pipe 28. The lower arm support pipe 27 is extended rearwardly from a point near a bent portion between the rear portion of the lower frame 21 and the rear frame 24. A rear end portion of the lower arm support pipe 27 is bent upwardly and connected to the vertical pipe 28.

An upper arm support pipe 29 is connected between a connection between the vertical pipe 28 and the overhang portion 26 and an intermediate portion in a vertical direction of the rear frame 24. The upper arm support pipe 29 is disposed substantially in parallel with, and upwardly of, the lower arm support pipe 27. The upper arm support pipe 29 and the lower arm support pipe 27 support an arm member for use in a double wishbone type rear wheel suspension system. The lower arm support pipe 27 includes stays 27a, 27b and the upper arm support pipe 29 includes stays 29a, 29b, respectively.

A final drive case 30, which constitutes one component of a transmission system, is supported between the lower arm support pipe 27 and the upper arm support pipe 29. A rear wheel axle 31 extends to the left and right from the final drive case 30. Each leading end of the rear wheel axle 31 is connected to a corresponding one of the rear wheels 3. In FIG. 1, reference numeral 32 represents a rear shock absorber of the rear wheel suspension.

Figure 2:
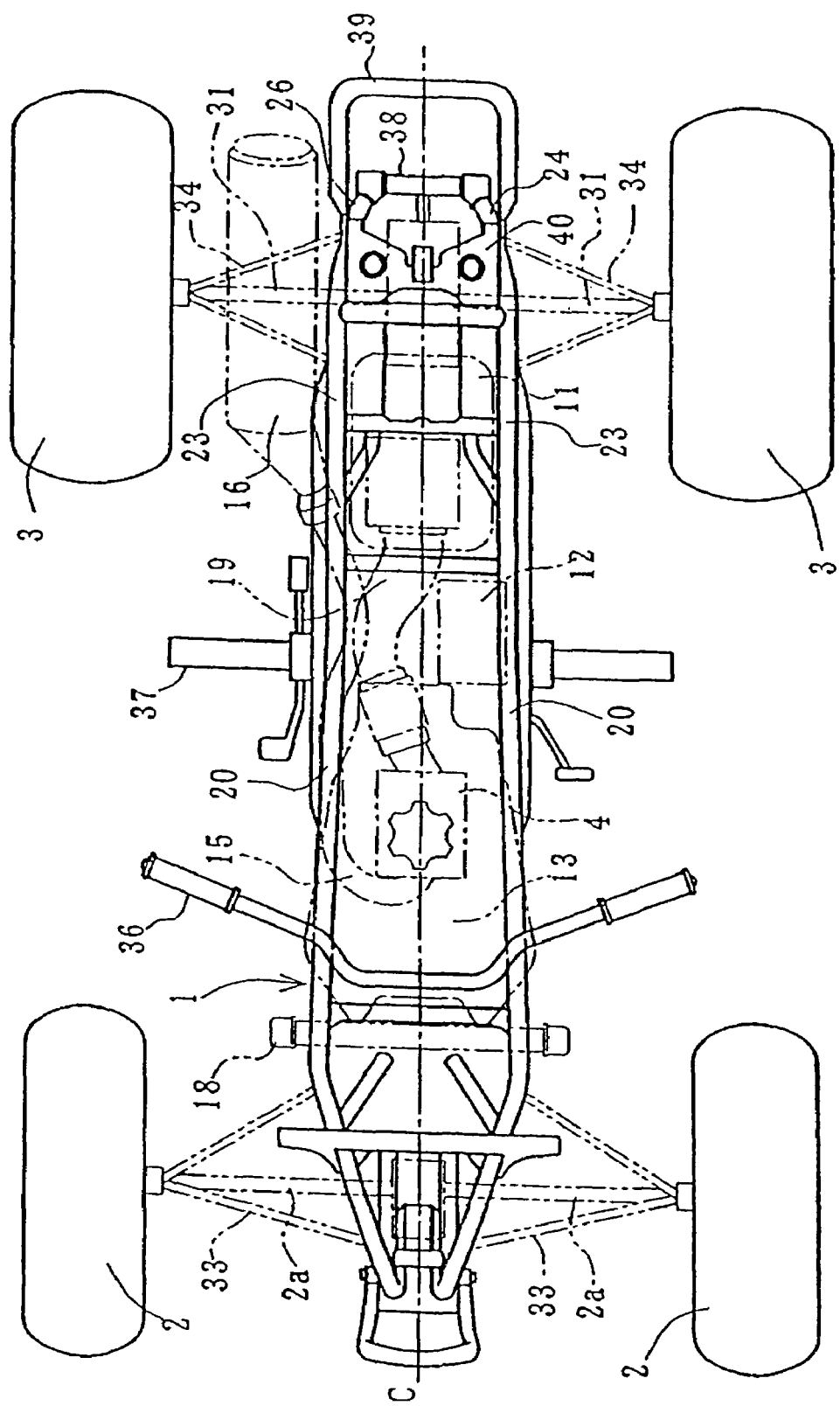
FIG. 2 is a plan view of the vehicle of FIG. 1 showing the front and rear wheels supported with a double wishbone type suspension.

FIG. 2 is a top plan view showing the vehicle body frame 1. The front wheels 2 include a double wishbone type front wheel suspension. Referring to FIG. 2, the front wheel suspension includes an upper arm of the front wheel suspension 33 and a front wheel axle 2a. Similarly, the rear wheel suspension includes the rear wheel axle 31 and an upper arm of the rear wheel suspension 34, all being illustrated schematically. The upper arms 33, 34 represent upper ones of upper and lower suspension arms included in the double wishbone type suspension. Lower ones of the upper and lower suspension arms, that is, the lower arms are omitted. Each of the front wheels 2 and the rear wheels 3 is independently suspended on either side of the vehicle body.

The four-wheeled vehicle includes those members constituting the vehicle body frame 1 described with reference to FIG. 1 in the side view, disposed in pairs symmetrically opposed on either side about a vehicle body center C. The left and right portions are connected with a plurality of cross members to form an integrated body. The members constituting the vehicle body frame 1 are formed of steel pipes and the like. As shown in FIG. 2, reference numeral 36 represents a handlebar; reference numeral 37 represents a step; reference numeral 38 represents a cross pipe connecting the lower end portions of the left and right overhang portions 26; and reference numeral 39 represents a carry pipe.

Figure 3:
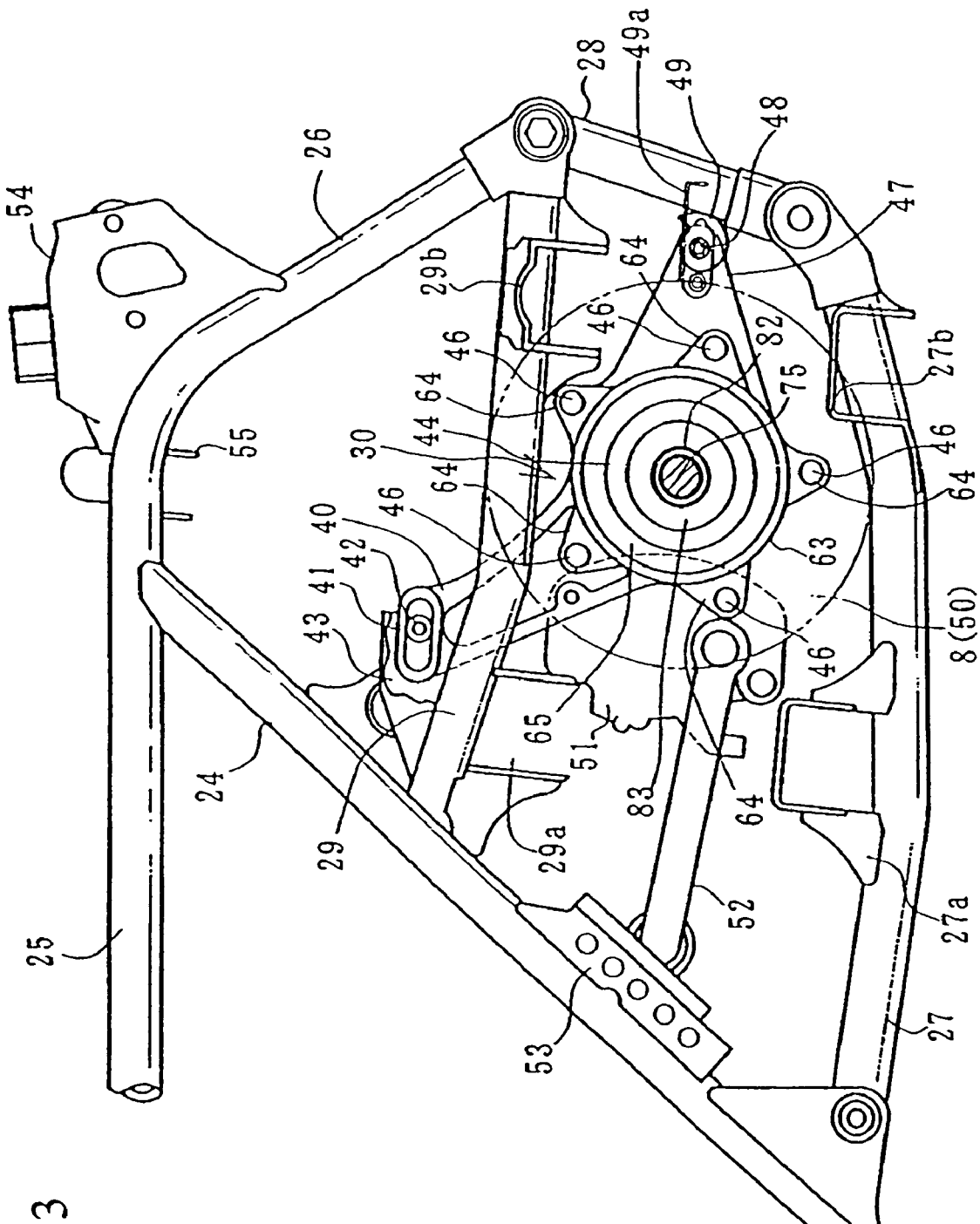
FIG. 3 is an enlarged side elevational view of a rear portion of a vehicle body frame showing that portions of the vehicle body frame overlap the brake disk and driven sprocket when viewed from a side of the vehicle.

FIG. 3 is an enlarged side elevational view showing the rear portion of the vehicle body frame. The final drive case 30 is disposed between the left and right upper arm support pipes 29 and the left and right lower arm support pipes 27. A front side mounting arm 40 is extended obliquely upwardly from an upper portion on a front side of the final drive case 30. The front side mounting arm 40 has a leading end boss 41 formed thereon. The leading end boss 41 includes a slot formed therein. The front side mounting arm 40 is supported by a support shaft 42 passed through the slot onto a bracket 43 disposed at a front end portion of the upper arm support pipe 29. The support position can thereby be movably adjustable in the fore-aft direction.

A separate holder 63 is attached to a left side surface of the final drive case 30. The separate holder 63 holds a bearing 65 that journals an outer race of a left side joint to be described later. The separate holder 63 is removably mounted to the final drive case 30 by bolts 46 installed in mounting bosses 64. The mounting bosses 64 are protruded from an outer peripheral portion of the separate holder 63. According to the embodiment of the present invention, the mounting bosses 64 are equally spaced circumferentially on the separate holder 63 such that each forms a vertex of an equilateral pentagon. The final drive case 30 also includes mounting bosses that overlap corresponding ones of the mounting bosses 64.

A bearing holder 44 having a diameter smaller than that of the separate holder 63 is coaxially mounted at a central portion of the final drive case 30. The bearing holder 44 is visible on an inner peripheral side of the separate holder 63. A bearing 83 supported in the bearing holder 44 journals a joint portion shaft 82 of a right side joint. The joint portion shaft 82 has a tubular form. A rod-like joint portion shaft 75 of the left side joint is fitted into an inside of this joint portion shaft 82.

The final drive case 30 further includes a rear side mounting arm 47 formed on a rear portion thereof. The rear side mounting arm 47 protrudes outwardly from the bearing holder 44. The rear side mounting arm 47 has a leading end connected to a cam type adjuster 49 by way of a support shaft 48. The cam type adjuster 49 is rotatably supported on the vertical pipe 28 via a stay 49a. The cam type adjuster 49 rotates to movably adjust the position of the support shaft 48 in the fore-aft direction, thereby functioning as a chain adjuster that varies tension in the chain 9.

As seen in FIG. 3, the rear portion of the body frame includes a brake disc 50 that has a diameter substantially the same as that of, and overlaps, the driven sprocket 8. The brake disc is coaxially supported onto the right side of the final drive case 30 and braked by a brake caliper 51. The stays 27b, 29b that form part of the support portion of suspension arm overlap the driven sprocket 8 and the brake disc 50 when viewed from the outside in a side view, thereby partly covering the driven sprocket 8 and the brake disc 50.

Referring also to FIG. 3, the rear portion of the body frame includes a bracket 53 disposed on the rear frame 24. The bracket 53 supports a front end of a stabilizer 52. In addition, the rear portion of the body frame includes a carrier support bracket 54 and a bracket 55 that supports an upper end of the rear cushion 32. The bracket 55 is disposed in a boundary portion between the seat rail 25 and the overhang portion 26.

Figure 4:
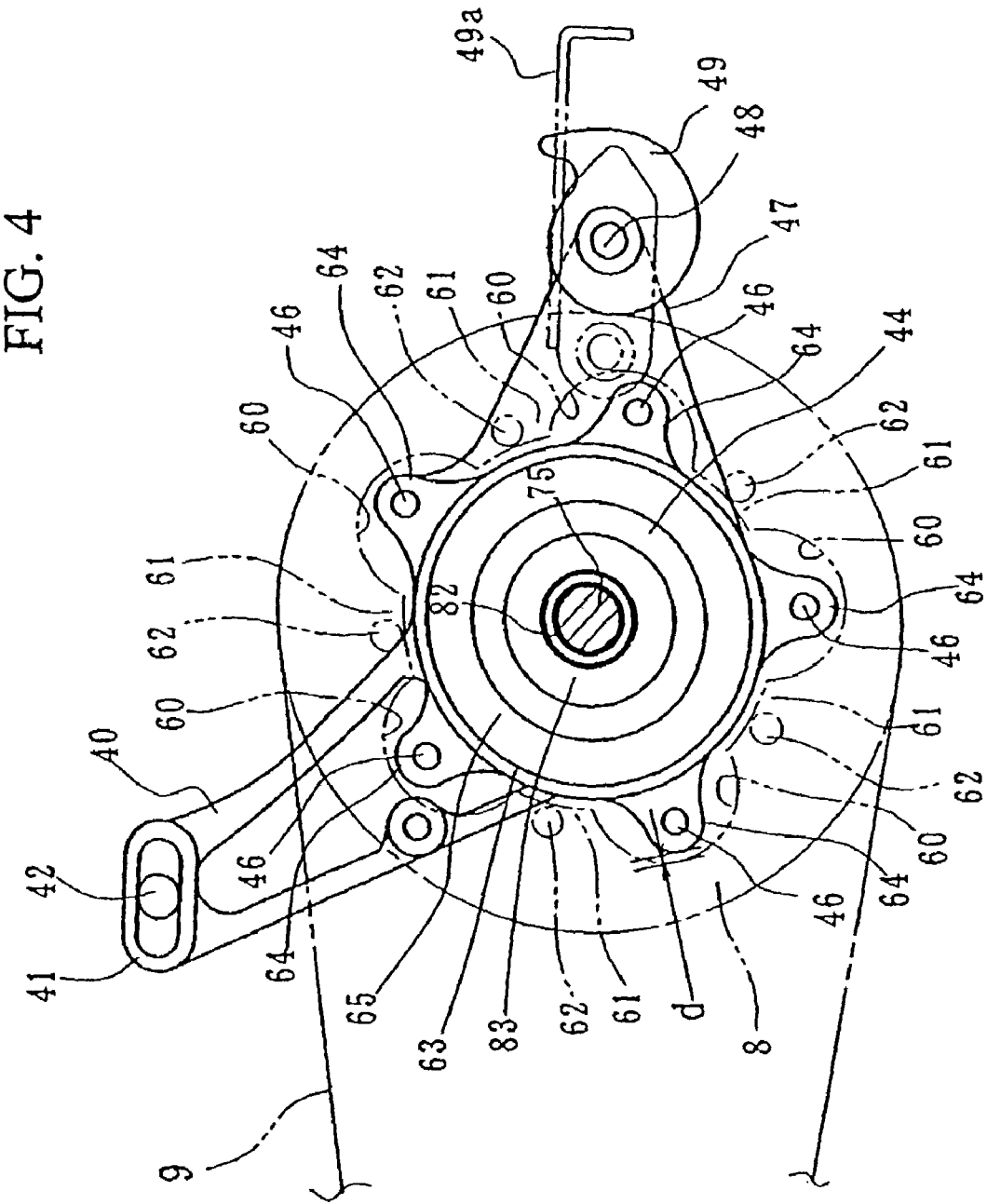
FIG. 4 is an isolated view of the separate holder and the driven sprocket showing a relationship between these components.

FIG. 4 is a view showing a relationship between the driven sprocket 8 and the final drive case 30. The driven sprocket 8 is substantially doughnut-shaped. The driven sprocket 8 includes cutouts 60 disposed on an inner peripheral portion thereof, equally spaced circumferentially. Each of the cutouts 60 is curved outwardly in a diametrical direction. The open space on the inner peripheral side looks substantially like petals of a flower as a whole.

The cutouts 60 correspond in number with the mounting bosses 64 and are formed at the same spacing. According to the embodiment of the present invention, each of the cutouts 60 is formed at position corresponding to a vertex of an equilateral pentagon. In addition, each of the cutouts 60 is larger in size than the mounting boss 64. In a side view, the entire profile of the mounting boss 64 fits into an inside of the cutout 60 such that a gap d is formed between a bottom portion of the cutout 60 and the vertex of the mounting boss 64. The bolts 46 can be removed and reinstalled through the cutouts 60.

A portion between each pair of two adjacent cutouts 60 forms a mounting portion 61 bulging toward the center. The mounting portions 61 are removably attached to a mounting flange of the left side joint to be described later using bolts 62 or the like.

In the example shown in FIG. 4, five each of cutouts 60 and mounting portions 61 are alternately continuously formed in the circumferential direction. Thus, the driven sprocket 8 includes at the inner peripheral portion thereof a substantially petal-shaped opening as a whole. The opening formed of these cutouts 60 and mounting portions 61 will hereinafter be referred to as a petal-shaped blanked hole. In this case, the cutouts 60 correspond to petals and the five cutouts 60 form substantially a five-petal shape.

An inner peripheral portion of each of the mounting portions 61 is disposed on a circle concentric with the driven sprocket 8. This concentric circle forms a portion having the smallest diameter of the petal-shaped blanked hole. In the side view of FIG. 4, the whole of the separate holder 63 fits inside this concentric circle. The five petals (cutouts 60) correspond in number with the mounting bosses 64 that form fastening portions for the separate holder 63. Further, the mounting bosses 64 are formed to be smaller than the cutouts 60, and are accommodated therein.

Figure 5:
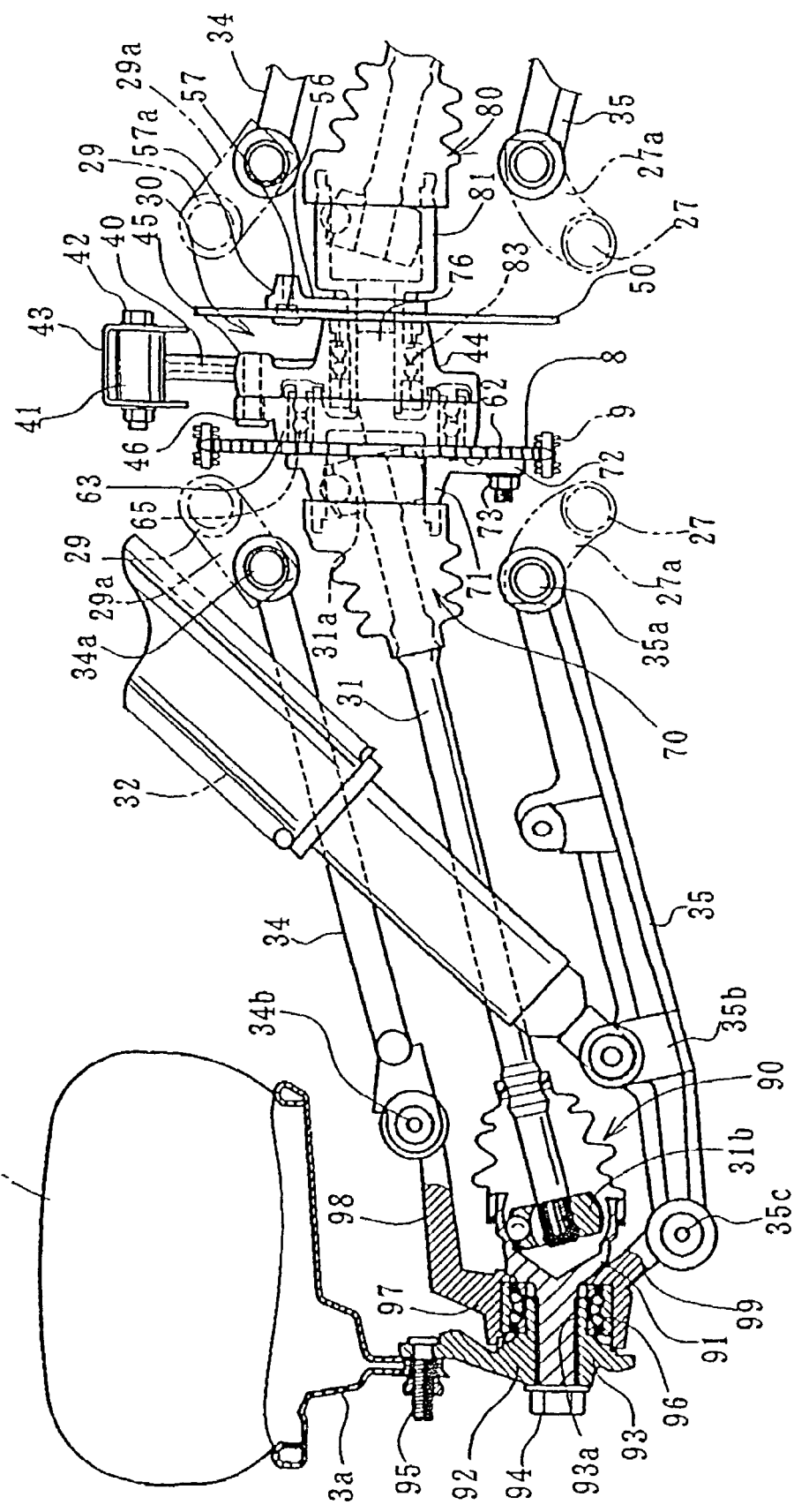
FIG. 5 is a rear view of the rear wheel suspension structure showing the brake disk and driven sprocket disposed between the left and right sides of the vehicle frame.

FIG. 5 is a partly cutaway view showing mainly the left rear wheel suspension structure as viewed from the rear of the vehicle body. The final drive case 30 rotatably supports a left side joint 70 on the left side via the separate holder 63. The driven sprocket 8 is mounted to a mounting flange 72 formed on an outer peripheral portion of the left side joint 70 using the bolts 62 and nuts 73.

A right side joint 80 is rotatably supported on the final drive case 30 on the right side thereof. The brake disc 50 is mounted on a flange 57 of a flange member 56 that is rotated integrally with an outer race 81 to be described later. The right side joint 80 and the brake disc 50 are coaxially disposed with the left side joint 70 and the driven sprocket 8. The final drive case 30 the brake disc 50, and the driven sprocket 8 may be referred to collectively as a final drive assembly.

An inner race 31a formed on a first end of the rear wheel axle 31 is fitted into an outer race 71 of the left side joint 70. The rear wheel axle 31 rotates integrally with the left side joint 70 and is pivotable relative to the left side joint 70. The rear wheel axle 31 extends obliquely downwardly toward the outside from the left side joint 70. The rear wheel axle 31 includes an inner race 31a formed on a leading end thereof and connected to a rear wheel side joint 90.

The rear wheel side joint 90 includes a hub shaft 92 that protrudes outwardly from a center of a cup-shaped outer race 91 that accommodates therein the inner race 31b. The hub shaft 92 passes through a center of a hub 93 so as to form a spline connection. Further, the hub shaft 92 has a protruding end thereof fixed with a nut 94 so as to allow the rear wheel side joint 90 to be rotated integrally with the hub 93. The hub 93 includes an outer peripheral portion that is integrated with a rim portion 3a of the rear wheel 3 through a bolt 95.

The hub shaft 92 passes through an inside of a boss portion 93a formed at the central part of the hub 93. A knuckle 97 is supported on an outer peripheral portion of the hub 93 via a bearing 96. The knuckle 97 includes an upper knuckle arm 98 and a lower knuckle arm 99 integrally formed therewith at an upper and lower portion, respectively, thereof. The upper knuckle arm 98 and the lower knuckle arm 99 extend inwardly of the vehicle body.

The upper arm 34 and a lower arm 35, each substantially forming a V shape, are extended above and below the rear wheel axle 31, respectively, substantially in parallel with each other. A proximal end portion 34a of the upper arm 34 on the inward side of the vehicle body is supported swingably onto the stays 29a, 29b (FIG. 3) of the upper arm support pipe 29. A distal end portion 34b of the upper arm 34 on the outward side of the vehicle body is supported rotatably on the upper knuckle arm 98.

A proximal end portion 35a of the lower arm 35 on the inward side of the vehicle body is supported swingably onto the stays 27a, 27b (FIG. 3) of the lower arm support pipe 27. The lower arm support pipe 27 further includes a mounting portion 35b at an intermediate portion thereof. A lower end portion of the rear shock absorber 32 is rotatably supported at this mounting portion 35b of the lower arm support pipe 27. Further, a distal end portion 35c of the lower arm 35 on the outward side of the vehicle body is rotatably attached to the lower knuckle arm 99.

These arrangements result in the following operation. Specifically, while being driven by the rear wheel axle 31, the rear wheel 3 is vertically pivotally movable about the proximal end portions 34a, 35a. At this time, the knuckle 97, the upper arm 34, and the lower arm 35 form a parallelogram linkage mechanism. This allows the rear wheels 3 to move vertically in parallel.

The relationship between the rear wheel axle 31 and the rear wheel 3, and the construction of the upper arm 34 and the lower arm 35, on the right-hand side of the vehicle body are identical to the left-hand side of the vehicle body. Detailed descriptions with illustrations will therefore be omitted.

Thus, the left and right rear wheels 3 are independently suspended on the left and right sides, respectively, on the vehicle body frame.

Figure 6:
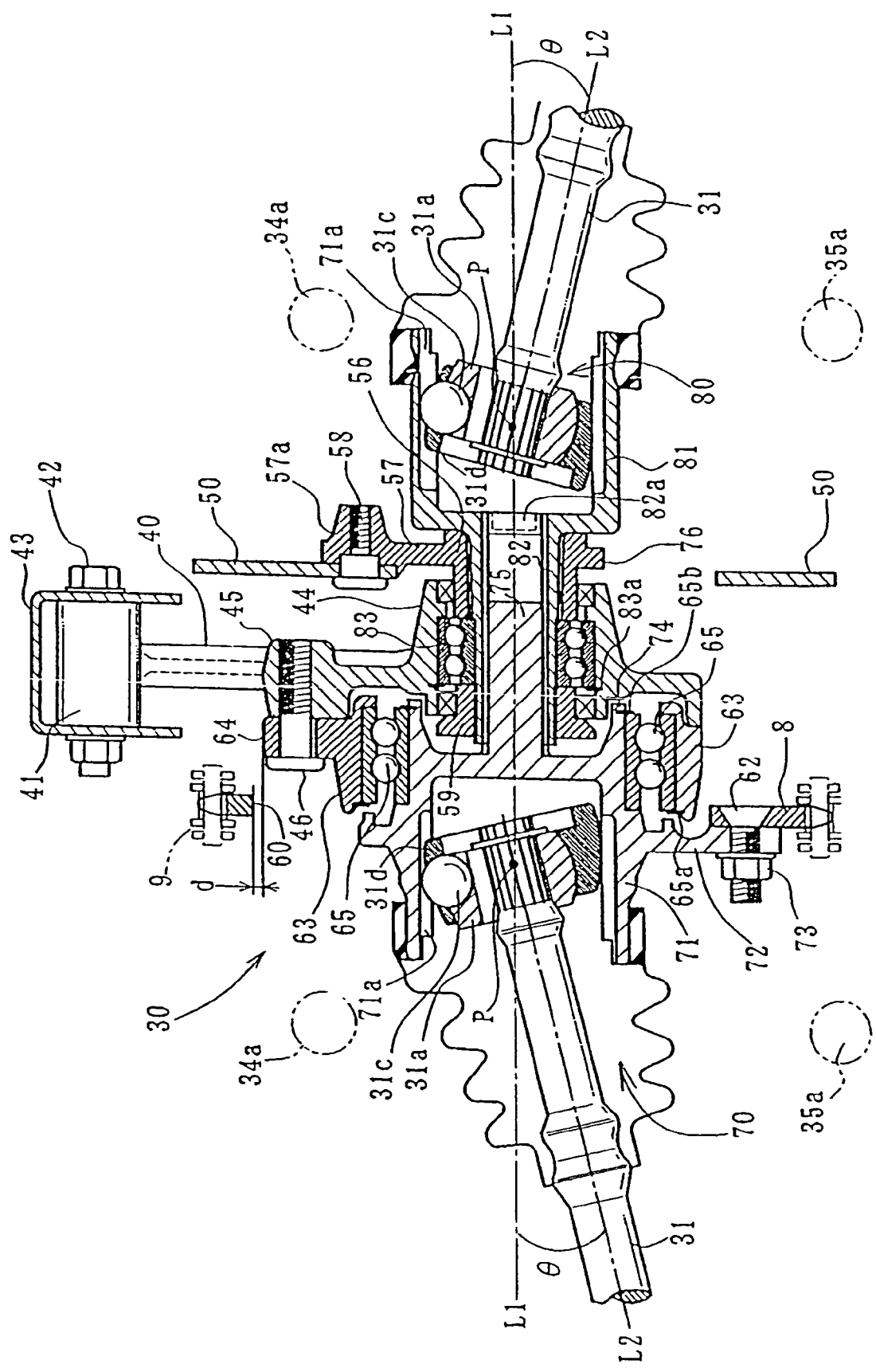
FIG. 6 is a cross-sectional view of the final drive case showing that the driven sprocket is supported by the left side joint and the brake disc is supported by the right side joint, and the left and right side joints are spline connected.

FIG. 6 is a cross-sectional view showing the left side joint 70 and the right side joint 80 in the final drive case 30, taken along the rear wheel axle 31. The bearing holder 44 of the final drive case 30 includes bosses 45 disposed on an outer peripheral portion thereof, equally spaced from each other. The mounting bosses 64 of the separate holder 63 overlap these bosses 45 and secured by the bolts 46 from a side.

The separate holder 63 supports the bearing 65 of the left side joint 70. A bearing portion 74 of the left side joint 70 is a bearing fit via the bearing 65 in an inner peripheral side of the separate holder 63. The bearing 65 is disposed on the bearing portion 74 and positioned in a thrust direction by clips 65a, 65b. The outer race 71 protruding continuously outwardly from the bearing portion 74 includes serrations 71a formed on an inner peripheral surface thereof. A ball 31c of the inner race 31a fits into the serrations 71a. The ball 31c is aligned by a gauge 31d. This joint structure forms the known constant-velocity universal joint.

The outer race 71 includes a mounting flange 72 formed on an outer peripheral portion thereof. The mounting flange 72 protrudes diametrically outwardly. The driven sprocket 8 is aligned with the mounting flange 72 from the inward side of the vehicle body and integrally fastened together by the bolts 62 and the nuts 73. To allow the driven sprocket 8 to be in mesh with the chain 9, the outer race 71 is rotatable relative to the separate holder 63 mounted in the final drive case 30 via the bearing 65 through a driving force of the chain 9.

The joint portion shaft 75 integrally protrudes inwardly of the vehicle body at an axial central portion of the outer race 71. The joint portion shaft 75 is a solid round bar having splines formed on an outer surface thereof. The joint portion shaft 75 fits into a shaft hole in the tubular joint portion shaft 82 that extends integrally from the outer race 81 and has splines formed in an inner peripheral surface thereof. The joint portion shaft 75 and the joint portion shaft 82 are thus provided with a spline connection to permit integrated rotation. The joint portion shaft 75 of the solid round bar form is a male, while the joint portion shaft 82 of the tubular form is a female. The joint portion shafts 75 and 82 thus provide a direct male-female connection. In FIG. 6, reference numeral 82a represents a cap fitted to a shaft hole end portion of the joint portion shaft 82.

The bearing holder 44 of the final drive case 30 includes the bearing 83 fitted into an inner peripheral side thereof. The bearing 83 journals an outer peripheral surface of the joint portion shaft 82. Thus, the outer races 71 and 81 are journaled by the bearings 65 and 83, respectively, and rotatably driven by the chain 9. The bearing 83 is positioned at a positioning portion disposed in the bearing holder 44 and locked in position so as not to come off by a circlip 83a.

The joint portion shaft 82 has splines formed on an outer periphery thereof. A base portion of the flange member 56 is in spline connection with the splines. The flange member 56 is thereby fitted externally between a shouldered portion of the outer race 81 and the bearing 83. Thus, the outer race 81 is positioned by the bearing 83. The joint portion shaft 82 has external threads cut on the outer periphery thereof. A nut 59 is fastened with the external threads and tightening the nut 59 positions and fixes the outer race 81 and the bearing 83.

The flange 57 extending diametrically outwardly on an outer periphery of the flange member 56 includes a boss 57a disposed on a leading end thereof. An inner peripheral portion of the brake disc 50 is removably fixed to the boss 57a using a bolt 58 installed from the inside of the vehicle body. The brake disc 50 and the driven sprocket 8 are disposed coaxially, separately on the right and left side, respectively, across the final drive case 30. Further, the brake disc 50 and the driven sprocket 8 are supported by different members. Specifically, the driven sprocket 8 is supported on the left side joint 70, while the brake disc 50 is supported on the right side joint 80.

The driven sprocket 8 and the brake disc 50 are disposed on the inside of each of the proximal end portion 34a of the upper arm 34 and the proximal end portion 35a of the lower arm 35. Each of these proximal end portions 34a, 35a forms a pivot on the vehicle body frame side of the upper arm 34 and the lower arm 35, respectively. Accordingly, each of the proximal end portions 34a, 35a indicates the position of the vehicle body frame in the vehicle width direction. The driven sprocket 8 and the brake disc 50 are disposed on the inside of the vehicle body frame. Thus, the vehicle body frame functions as a guard member for the driven sprocket 8 and the brake disc 50.

A joint angle θ of the rear wheel axle 31 is formed between a horizontal line L1 and an axis L2 of the rear wheel axle 31. If the distance between the left and right rear wheels 3, 3, or a wheel tread, is constant, and if an intersection point between the lines L1 and L2 is a joint center P, the smaller the distance between the left and right joint centers P, P, the smaller the smaller the joint angle θ.

Effects of the embodiment of the present invention will be next described. Referring to FIG. 6, the driven sprocket 8 and the brake disc 50 are disposed on the inside of each of the proximal end portion 34a of the upper arm 34 and the proximal end portion 35a of the lower arm 35, that is, on the inside of the vehicle body frame in the vehicle width direction. Further, the upper arm 34 and the lower arm 35 are disposed on the outside of the vehicle body frame. Thus, the upper arm 34 and the lower arm 35 can never interfere with the driven sprocket 8 and the brake disc 50. This eliminates the need for the circumventive disposition or the circumventive structure for the upper arm 34 and the lower arm 35. As a result, the degree of freedom in layout is enhanced and a required level of rigidity is achieved without increasing weight substantially. Moreover, the vehicle body frame functions as the guard member for the driven sprocket 8 and the brake disc 50.

Referring further to FIG. 3, the stays 27b, 29b that form part of the support portion of suspension arm overlap the driven sprocket 8 and the brake disc 50 from the outside in the side view of the vehicle, thereby partly covering the driven sprocket 8 and the brake disc 50. This means that the stays 27b, 29b also function as a guard member, achieving an enhanced guard function suitable for the vehicle intended for rough road use.

While a working example of the present invention has been described above, the present invention is not limited to the working example described above, but various design alterations may be carried out without departing from the present invention as set forth in the claims.

What is claimed is:

1. A suspension structure for a vehicle,
the vehicle comprising
 a vehicle body frame, the vehicle body frame including left and right subframes, and
 left and right drive wheels,
the suspension structure comprising:
 a final drive assembly of a transmission system supported on the vehicle body frame, the final drive assembly comprising:
  a final drive case including a front mounting arm extending upwardly at an upper front portion thereof, and a rear mounting arm extending rearwardly at a rear portion thereof, wherein the front mounting arm and the rear mounting arm operatively support the final drive case on the vehicle body frame,
a driven sprocket, to which a driving force of an engine is transmitted,
a brake disc mounted coaxially with the driven sprocket, wherein the driven sprocket and the brake disc are both mounted to the final drive case, and
a plurality of suspension arms, wherein
the left and right drive wheels are supported on the left and right vehicle body subframes via respective suspension arms,
the suspension arms are disposed outside the vehicle body frame, and
the driven sprocket and the brake disc are disposed inside the vehicle body frame.

2. The suspension structure according to claim 1,
wherein each subframe of the vehicle body frame includes a support portion of the respective suspension arm; and
wherein at least part of the support portion is disposed so as to overlap the driven sprocket or the brake disc when viewed from a left or right side of the vehicle.

3. The suspension structure according to claim 1, wherein the brake disc and the driven sprocket are disposed on opposed sides of the final drive case, and wherein a support portion is disposed laterally outward relative to each of the brake disc and the driven sprocket.

4. The suspension structure according to claim 1, wherein each of the left and right subframes comprises an upper arm support pipe and a lower arm support pipe, each of the upper arm support pipes and lower arm support pipes extend substantially horizontally, and wherein a support portion is fixed to each upper arm support pipe.

5. The suspension structure according to claim 4 wherein each of the support portions rotatably supports a suspension arm.

6. The suspension structure according to claim 4 wherein the left and right drive wheels are driven via left and right side wheel axles operatively connected to the final drive case, and
wherein, for each of the left and right subframes,
a support portion is fixed to each upper arm support portion at a position forward of the axle and at a position rearward of the axle, and
a support portion is fixed to each lower arm support portion at a position forward of the axle and a position rearward of the axle.

7. The suspension structure according to claim 1, wherein the position of the final drive case with respect to the vehicle body frame is adjustable in the front-to-rear direction of the vehicle.

8. The suspension structure according to claim 1, wherein the driven sprocket comprises a substantially annular plate having an inner peripheral edge and an outer peripheral edge, and wherein the annular plate is provided with plural curved cutouts disposed along the inner peripheral edge.

9. The suspension structure according to claim 1, wherein the final drive case comprises plural mounting bosses extending outwardly from an outer peripheral portion thereof, the mounting bosses equidistantly spaced about an axis that is co-axial with the axis of the drive sprocket,
wherein the driven sprocket comprises a substantially annular plate having an inner peripheral edge and an outer peripheral edge, and wherein the annular plate is provided with plural curved cutouts formed therein and disposed along the inner peripheral edge, and
wherein the number of cutouts corresponds to the number of mounting bosses, the cutouts are formed at the same spacing as the mounting bosses, and each cutout is larger in size than the corresponding mounting boss such that in side view, an entire periphery of the mounting boss resides within a respective cutout,
whereby mounting bolts received by the mounting bosses can be accessed via the cutouts.

10. The suspension structure according to claim 1, wherein the final drive case rotatably supports a first constant velocity universal joint and a second constant velocity universal joint, the first and second constant velocity universal joints extending from opposed sides of the final drive case, the first constant velocity universal joint operatively connected to the second constant velocity universal joint so as to permit integrated rotation of the first and second constant velocity universal joints.

11. The suspension structure according to claim 10, wherein the first constant velocity universal joint and the second constant velocity universal joint comprise coaxial, nested, spline-connected shafts.

12. The suspension structure according to claim 10, wherein the brake disc is configured to rotate integrally with the first and second constant velocity universal joints.

13. The suspension structure according to claim 10, wherein the driven sprocket is supported on the first constant velocity universal joint and the brake disc is supported on the second constant velocity universal joint.

14. A suspension structure for a vehicle,
the vehicle comprising
a vehicle body frame, the vehicle body frame including left and right subframes, and
left and right drive wheels,
the suspension structure comprising
a final drive case of a transmission system supported on the vehicle body frame, the final drive case including a driven sprocket, to which a driving force of an engine is transmitted, the final drive case also including a brake disc mounted coaxially with the driven sprocket, and
suspension arms,
wherein
the left and right drive wheels are supported on the left and right vehicle body subframes via respective suspension arms,
the suspension arms are disposed outside the vehicle body frame,
the driven sprocket and the brake disc are disposed inside the vehicle body frame and
wherein each of the left and right subframes comprises an upper arm support pipe and a lower arm support pipe, each of the upper arm support pipes and lower arm support pipes extend substantially horizontally, and wherein a support portion is fixed to each upper arm support pipe.

15. The suspension structure according to claim 14 wherein each of the support portions rotatably supports a suspension arm.

16. The suspension structure according to claim 14 wherein the left and right drive wheels are driven via left and right side wheel axles operatively connected to the final drive case, and
wherein, for each of the left and right subframes,
a support portion is fixed to each upper arm support portion at a position forward of the axle and at a position rearward of the axle, and
a support portion is fixed to each lower arm support portion at a position forward of the axle and a position rearward of the axle.

17. A suspension structure for a vehicle,
the vehicle comprising
- a vehicle body frame, the vehicle body frame including left and right subframes, and
- left and right drive wheels, the suspension structure comprising
- a final drive case of a transmission system supported on the vehicle body frame, the final drive case including a driven sprocket, to which a driving force of an engine is transmitted, the final drive case also including a brake disc mounted coaxially with the driven sprocket, and
- suspension arms, wherein
- the left and right drive wheels are supported on the left and right vehicle body subframes via respective suspension arms,
- the suspension arms are disposed outside the vehicle body frame,
- the driven sprocket and the brake disc are disposed inside the vehicle body frame and
- wherein the final drive case rotatably supports a first constant velocity universal joint and a second constant velocity universal joint, the first and second constant velocity universal joints extending from opposed sides of the final drive case, the first constant velocity universal joint operatively connected to the second constant velocity universal joint so as to permit integrated rotation of the first and second constant velocity universal joints.

18. The suspension structure according to claim 1, wherein the driven sprocket and the brake disc are disposed on the inside of a proximal end portion of each of the respective suspension arms.

* * * * *